United States Patent [19]
Whittaker

[11] Patent Number: 5,717,900
[45] Date of Patent: *Feb. 10, 1998

[54] ADJUSTING PRIORITY CACHE ACCESS OPERATIONS WITH MULTIPLE LEVEL PRIORITY STATES BETWEEN A CENTRAL PROCESSOR AND AN INVALIDATION QUEUE

[75] Inventor: Bruce Ernest Whittaker, Mission Viejo, Calif.

[73] Assignee: Unisys Corporation, Blue Bell, Pa.

[*] Notice: The term of this patent shall not extend beyond the expiration date of Pat. No. 5,506,967.

[21] Appl. No.: 592,095

[22] Filed: Jan. 26, 1996

[51] Int. Cl.[6] .................................... G06F 13/00
[52] U.S. Cl. .................................. 395/478; 395/250
[58] Field of Search .................... 395/478, 473, 395/250, 471

[56] References Cited

U.S. PATENT DOCUMENTS

| | | | |
|---|---|---|---|
| 5,347,648 | 9/1994 | Stamm et al. | 395/182.03 |
| 5,398,325 | 3/1995 | Chang et al. | 395/403 |
| 5,506,967 | 4/1996 | Barajas et al. | 395/250 |
| 5,530,933 | 6/1996 | Frink et al. | 395/468 |
| 5,579,504 | 11/1996 | Callander et al. | 395/471 |

OTHER PUBLICATIONS

Christensen et al., "Overrun Protection for Buffer Stacks", IBM Technical Disclosure Bulletin, V.15, No.12, pp. 3857-3858, May 1973.

Primary Examiner—Tod R. Swann
Assistant Examiner—Christopher S. Chow
Attorney, Agent, or Firm—Alfred W. Kozak; Mark T. Starr; Steven R. Petersen

[57] ABSTRACT

A computer network is connected via dual system busses to multiple digital modules such as a Central Processing Module with a Central Processor and also to a main memory module, plus an I/O module in addition to other possible modules, such as other Central Processing Modules. The Central Processor has a cache memory which is accessed on the basis of adjustable priorities, the most normal situation being that the Central Processor has first priority to cache access. However, under certain other conditions, the priority of access to cache is adjusted to give priority to an invalidation queue when it is almost full of invalidation addresses to be processed on invalidation cycles to the cache memory. Another priority is given to the invalidation queue after a Read-Lock operator is initiated by the processor. The resulting adjustable priorities work to optimize the integrity and speed of throughput of the system.

10 Claims, 10 Drawing Sheets

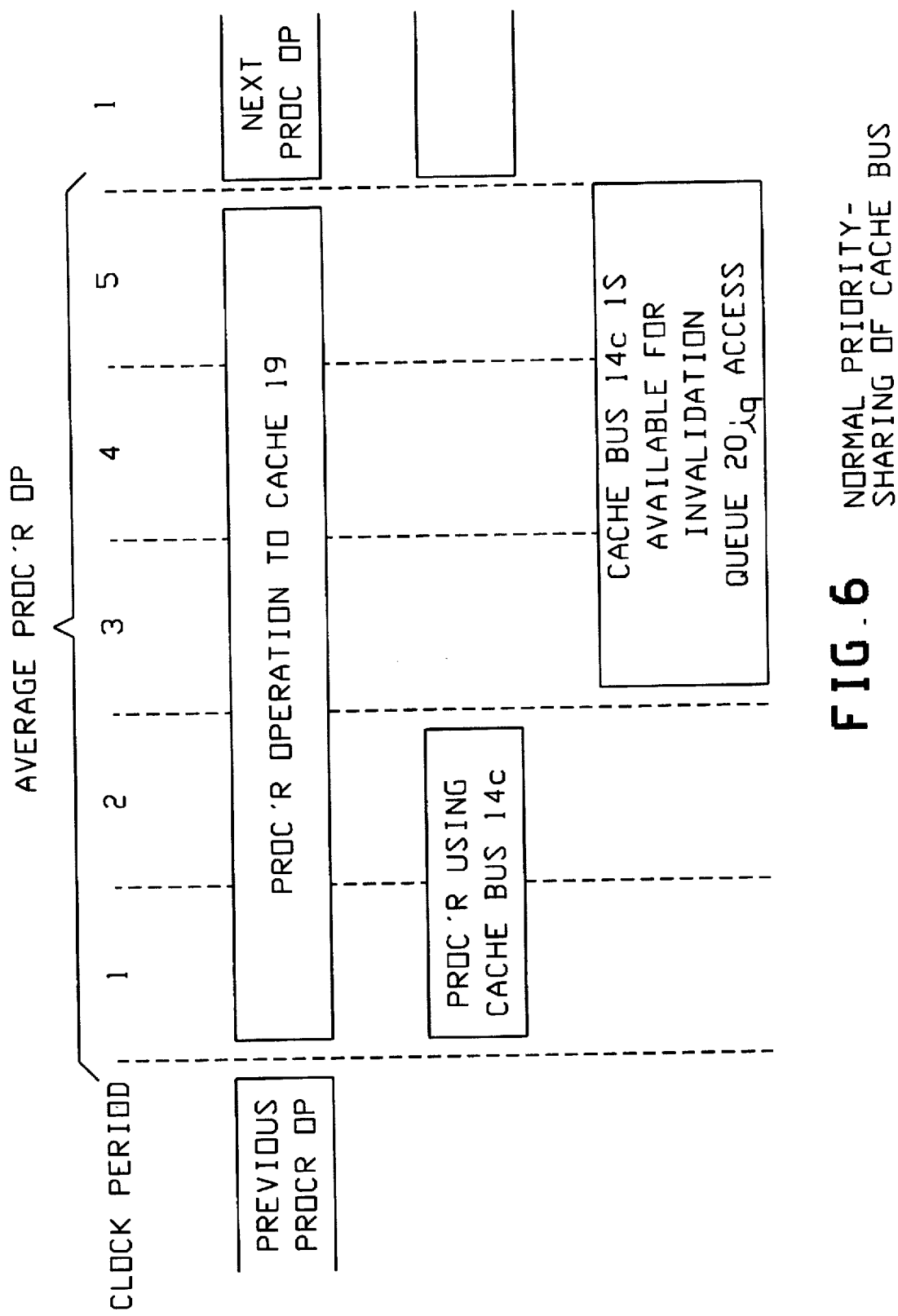
FIG. 6   NORMAL PRIORITY-
SHARING OF CACHE BUS

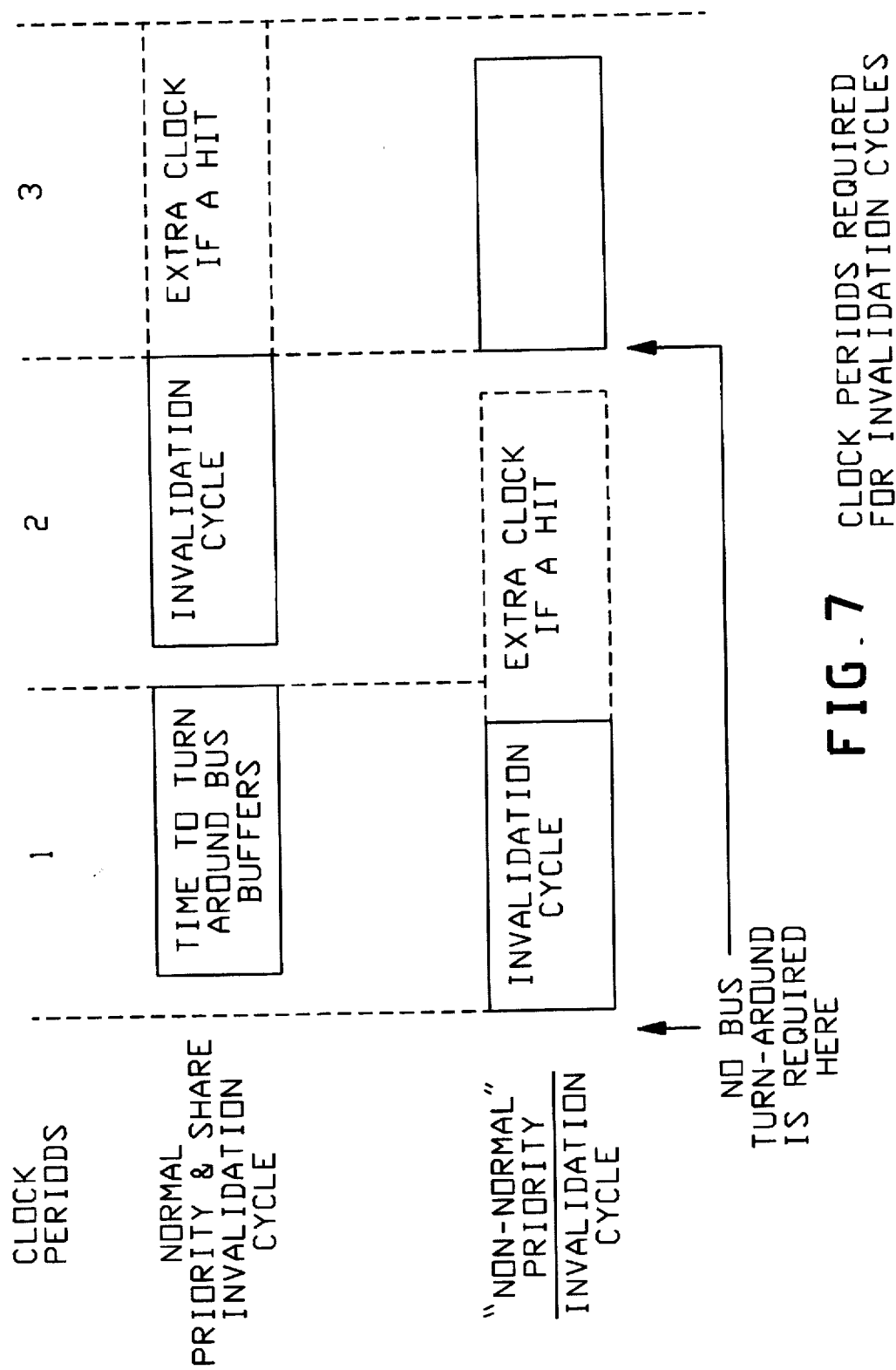
FIG. 7 CLOCK PERIODS REQUIRED FOR INVALIDATION CYCLES

ADJUSTING PRIORITY CACHE ACCESS OPERATIONS WITH MULTIPLE LEVEL PRIORITY STATES BETWEEN A CENTRAL PROCESSOR AND AN INVALIDATION QUEUE

FIELD OF THE INVENTION

This disclosure involves a cache memory system for computer processors which provides multiple operational priorities in order to facilitate greater throughput of processor operations.

BACKGROUND OF THE INVENTION

As seen in FIG. 3, there is indicated a general picture of computing system. FIG. 3 shows the central processing module 10 (CPM) which provides the processing computing activities for this system. Also shown is the main memory module 40 of the system and several other system modules 50 and 70 connected to the system bus $22_s$. The additional modules, such as 50 and 70, may include other central processing module units or input/output processing units. All of these system modules are interconnected by and communicate through a system bus $22_s$, which may involve dual redundant system busses.

In the system of FIG. 3, the central processing module 10 can generally operate internally much faster (at a higher frequency) than can the system bus $22_s$ or the system main memory 40. Since the main memory 40 is costeffectively implemented with dynamic RAM devices, it will generally operate much slower than the rates at which the processor can operate.

Since there occurs this inherent speed discrepancy between the high rate of the processor and the slower rate of the system bus and main memory module, then it can be seen that, without help from some extra hardware, the processor 14 (FIG. 2) in the central processing module 10 (FIG. 3) will have to wait for information from the bus $22_s$ and from the maim memory 40. However, it should be noted that this waiting is most detrimental to system performance. Thus, the addition of a unit such as cache memory 19 of FIG. 2 alleviates the situation by directly providing instruction code and data to the processor 14 of FIG. 2.

Thus, as seen in FIG. 2, the central processing module 10 is seen to have a processor 14 which uses an internal bus $14b$ to connect to the high speed cache memory module 19. In general, the cache design will utilize rather high speed but also costly static RAM devices. These devices provide very rapid data availability for certain portions of the memory requirements of the processor 14.

FIG. 2 is a basic diagram of a cache memory module 19. Shown therein is an incoming processor connection called the processor bus $14b$ and the outgoing system bus shown as $22s$. Internal to the cache module 20 is a cache bus $14c$. Attached to this cache bus $14c$, there is shown a Tag-RAM assembly $19t$ and Data RAM assembly $19d$. The Tag-RAM $19t$ monitors addresses from the processor for memory operations so that this assembly will detect whether the cache 19 contains a valid copy of the addressed word desired by the processor. The Tag-RAMs produce a "hit" on line 27 to indicate if the cache Tag RAM $19t$ does indeed hold this address item.

The Data RAMs $19d$ contain a large number of memory data values that can be indexed by their address values. If the Tag-RAM indicates a "hit" condition, then the Data RAM can supply the data information almost immediately to the processor 14 without the processor needing to access the system bus resources, $22s$.

In FIG. 1, there are a series of buffer isolation units designated $14bc$, $14bi$, $14bs$, $14by$ which are bidirectional in nature and which provide bus isolation.

For ease of description, FIG. 2 is a simplified drawing of the operating system. Realistically, the cache unit 19 may have several different bus structures, sometimes perhaps separate address busses and data busses and sometimes perhaps even partial address busses. Also, there are several different types of cache architectures which are commonly used.

The particular situation of this disclosure is applied to the type of cache commonly called "Write-Through" cache. Here all the "Write" type operations go to the main memory 40. Additionally, the cache Data RAMs $19d$ will be updated with the new "Write information" if the Tag-RAM $19t$ indicates that a "hit" exists on a particular address value.

However, if the system contains other modules that can also access main memory 40, such as for example the I/O processor modules and/or additional central processing modules 50 and 70 as indicated in FIG. 3, then the cache module 19 must include some additional hardware logic to assure that the data in cache and the data in the main memory stay in synchronization or coherency.

In order to insure coherency between data residing in the cache module 19 and the data residing in the main memory 40, there is provided the spy (snooping) logic unit 20 shown in FIG. 1. Here, the spy or snooping logic unit 20 is connected to the system bus $22_s$ such that the spy logic 20 monitors the system bus $22s$ activity for occurrence of address values that possibly may also be contained within the cache module 19. Of particular importance here are the address values for any "Write" type operation that will modify the data value at any address in main memory 40. Such addresses (which have just been written-to and modified) are then placed within a queuing mechanism shown as the invalidation queue $20iq$ which resides in the cache module 19 of FIG. 1.

Then, at some subsequent convenient time within cache operations, these addresses residing in the invalidation queue $20iq$ are brought out of the queue and sent on to the cache busses $14_c$ for address match investigation in the cache Tag-RAM $19t$.

If the Tag-RAM $19t$ indicates a "hit" condition on this particular address value, then the system requires that there be provided an "invalidation" cycle to take place, so as to mark, as "invalid," that particular address in the cache Tag-RAM $19t$ which has just been altered in the main memory address which corresponds to the Tag-RAM address. Thus, a "hit" will not occur when this particular address is subsequently presented to the cache 19 until a new value for this address may sometime later be put back into the cache so that the data in the cache is coherent with the data in the main memory 40.

With the use of the spy logic 20, and the invalidation queue $20iq$ with a need for an invalidation cycle to occur, it will be seen, as per FIG. 1, that there are two sources of address values "contending" for usage of the cache bus $14_c$. These two contending sources are the processor 14, itself, as well as the invalidation queue $20iq$. Thus, problems are presented in computer operations as to how to handle this "contention" situation. The present disclosure presents a method of providing for multiple levels of priority for the access and use of the critical and most valuable cache module resources.

SUMMARY OF THE INVENTION

In the Central Processing Module of a computer system having a system bus and several external modules connected to the system bus, there is provided a cache memory unit for the processor which cache is operated on the basis of multi-level adjustable priority cache operations.

In normal circumstances, an invalidation queue gets access to the cache memory unit only when the processor does not need it. Thus, invalidation cycles from the invalidation queue are worked to operate in-between processor accesses to the cache. This is the normal case.

However, some two additional priority conditions can occur that can cause access priority to the cache module to be changed. These involve "non-normal" conditions where the priority scheme to the cache will adjust the access rules for access to the cache module. The first of these non-normal conditions is called "Mandatory-Invalidation". When this condition occurs, the priorities to the cache are adjusted to give the invalidation queue the first right of access to the cache while the processor access may have to wait. For example, if the invalidation queue should become full, then spy logic will automatically force all subsequent memory write operations on the system busses to be aborted. Thus, in the present embodiment, the "Mandatory-Invalidation" state occurs when the invalidation queue senses that it is "almost full," that is to say, when it is ⅞ths full and contains 448 invalidation address values instead of the normal 512.

The second "non-normal" condition is called the "Queue-Flush" condition. Here, cache access is adjusted to remove the processor 14 off the cache bus 14c and to put the invalidation queue 20iq on to the cache bus 14c. The "Queue-Flush" condition occurs when the processor starts to function to do what is called a "Read-Lock" operator to the cache in main memory 40. This "Read-Lock" involves a situation where the processor is involved with contention on areas of main memory and the main memory is shared by multiple processors. Thus, when the processor does a "Read-Lock" operator, the invalidation queue must be "flushed" of all address values that preceded the "Read-Lock" to memory. This does not involve disposing or throwing away the addresses, but does mean that the stored addresses, in the invalidation queue, must be immediately executed out from the invalidation queue 20iq to the cache memory unit 19 using invalidation cycles.

BRIEF DESCRIPTION OF THE DRAWINGS

FIG. 6 shows timing periods used for sharing the cache bus in the "Normal" priority condition;

FIG. 7 contrasts the timing periods of operation between the "Non-Normal" priority condition and the "Normal" priority condition;

DESCRIPTION OF PREFERRED EMBODIMENT

Figure 1:
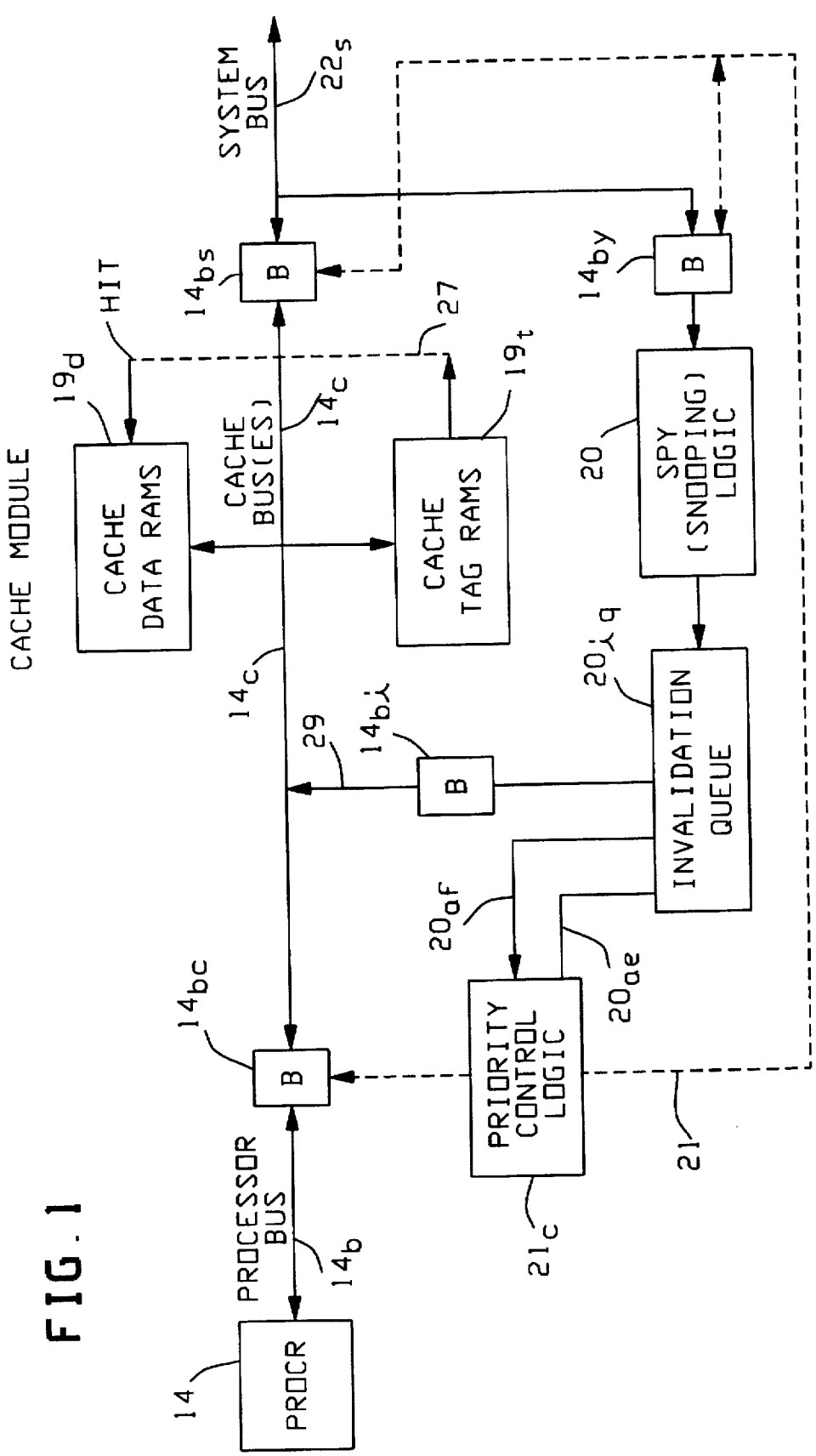
FIG. 1 is a block diagram of the cache module connected by busses to an invalidation queue which is activated by a spy or snooping logic unit.

It can be seen in FIG. 1 that two different sources of address values directed to the cache module 19 will contend for use of the cache resources. These two sources are (i) the processor 14 and (ii) the invalidation queue 20iq. Both of these sources need to use the cache Tag RAMs 19t in order to investigate the possibility of whether the cache data RAMs 19d contain a valid copy of data at the specified address value.

Figure 4:
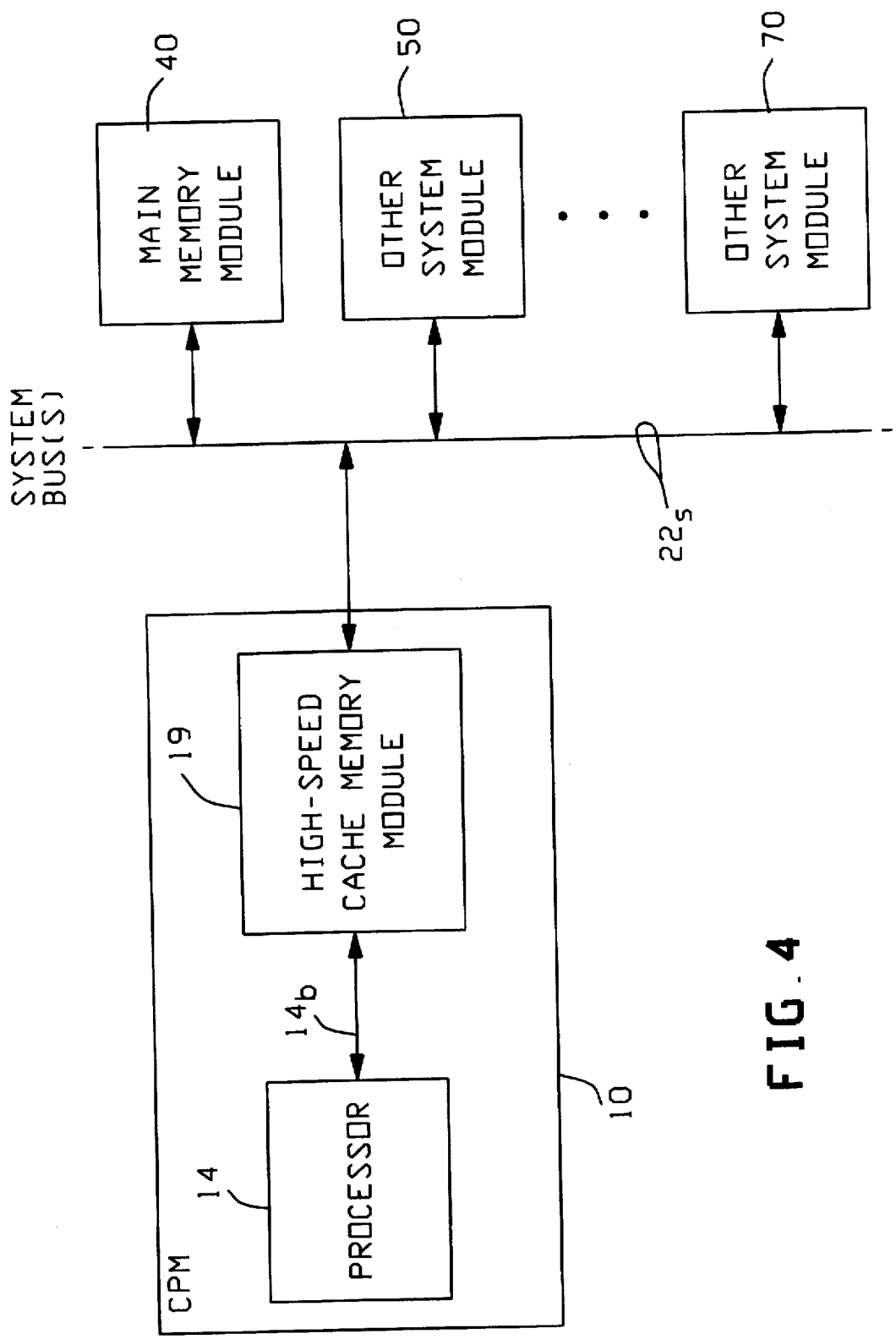
FIG. 4 is a block diagram of the elements in the Central Processing Module and showing the processor connected to a high speed cache memory module.

The processor 14 requires the use of the cache resources for all of its memory-type operations, that is to say, for all memory reads and memory writes. The processor 14 will do this type of cache access operation very frequently, possibly on the average about every five clock periods. The invalidation queue 20iq source is asynchronous to the processor 14 as far as contention for the cache module 19 is concerned. Thus, the addresses that are queued in the invalidation queue 20iq come from the system bus 22s operations performed by other of the connected system modules which use the main memory 40 (FIG. 4). These other system modules 50 and 70, etc., operate to function and do their own tasks quite independently of what the local processor 14 may be doing.

It may be indicated that the overall job of a computer system, in the first place, is its function to process data. The processor 14 is the element that does this. The other system modules are basically there to support and assist the processor 14 in its work. Thus, it is desirable, if not mandatory, that none of the modules hinder the processor 14 from getting its work done just because the auxiliary extra modules 50, 70 are using the necessary resources such as the cache module 19.

Although sometimes the auxiliary modules (50, 70, FIG. 4) on the systembus $22_s$ will cause access to the cache module 19 [via the spy logic 20 and the invalidation queue 20iq] their need for access to the cache is normally less critical to system efficiency than is that of the processor 14. Usually, the queued address values (stored in invalidation queue 20iq) from the other auxiliary system modules 50 and 70 can wait for the opportunity to access the cache module 19. The processor 14 is the fastest and speediest operating module in the mix of modules in the system. The processor is a device that is designed to be very fast. The cache module 19 was implemented into computer systems, sometimes on a very costly basis, solely for the purpose of providing the processor 14 with the data it needs in the most rapid and expedient manner. It would not be operatingly efficient to allow the spy logic 20 and invalidation queue 20iq to delay the processor under most of the normal operating circumstances.

The present system is organized to set up multiple priority conditions in regard to usage of the cache module 19. Under normal situations, the processor 14 will always have the highest priority and the first right to access at the cache module 19. However, to facilitate the processor's high priority state and to give it the quickest possible entrance to the cache Tag RAM unit 19t, the cache bus 14c is normally enabled to receive addresses only from the processor 14.

In the presently described system of FIG. 1, a buffer 14bc is placed between the processor bus 14b and the cache bus 14c, such that the buffer 14bc is normally enabled to drive. The Priority Control Logic 20c in FIG. 1 controls the direction of signal pass-through for the isolation buffers 14bc, 14bi, 14by and 14bs which control access to the cache bus 14c as indicated by the dashed lines 21. The Priority Control Logic 20c monitors the invalidation queue signals on line 20af (Almost Full) and line 20ae (Almost Empty) shown in FIG. 8 and FIG. 1. It also senses when a Read-Lock OP is initiated.

Figure 2:
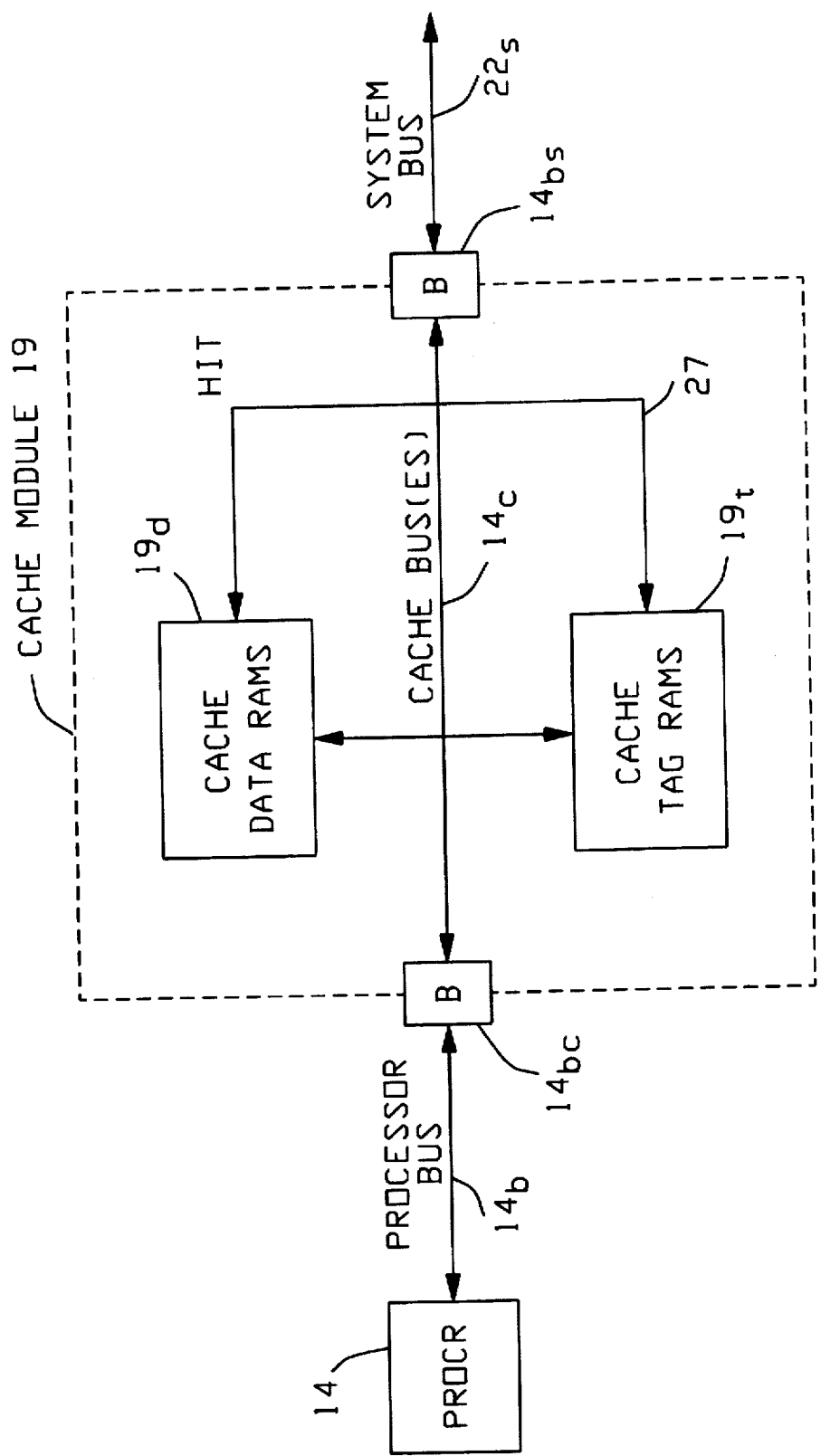
FIG. 2 is a drawing of the cache module showing the various busses involved and the cooperating tag RAMs and data RAMs.
Figure 3:
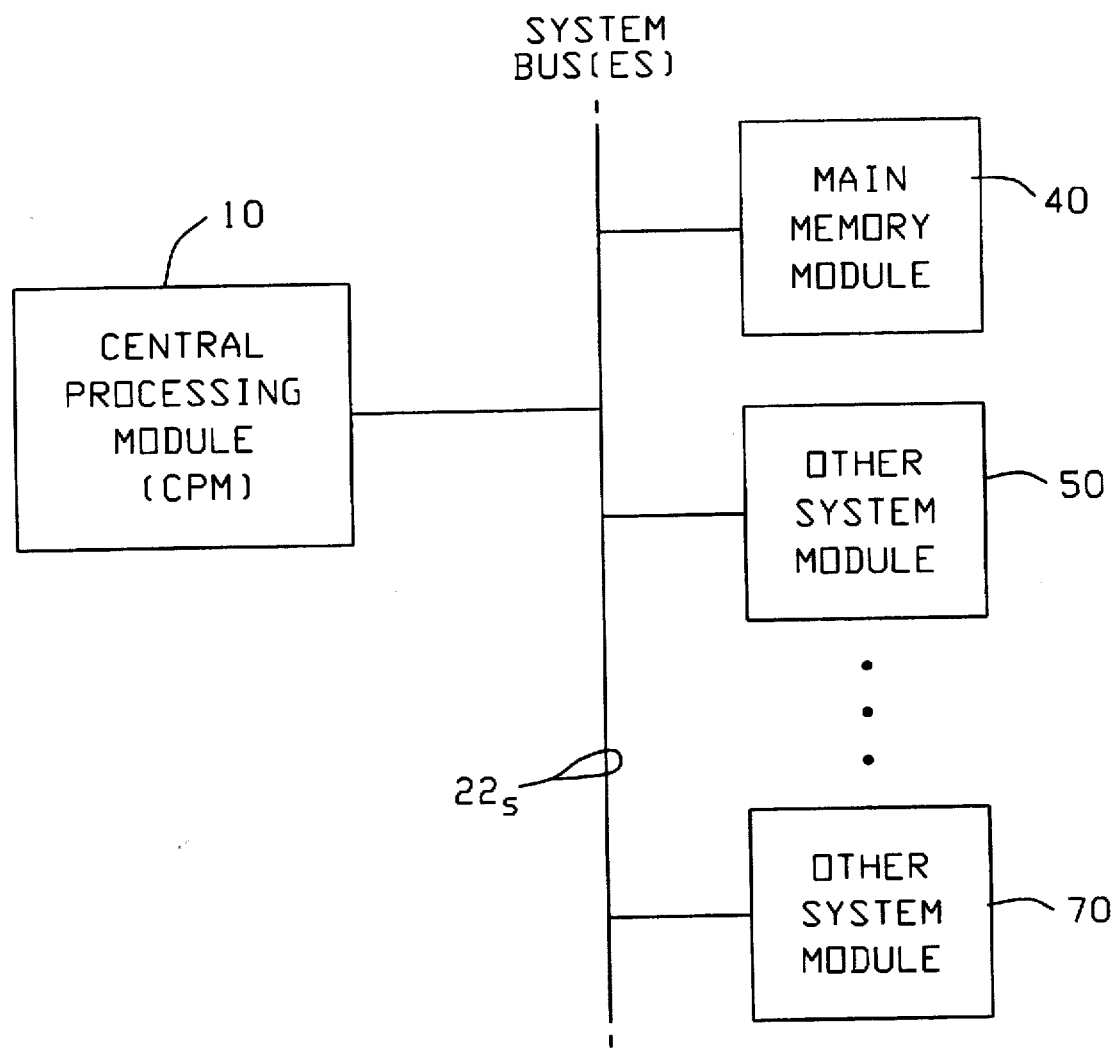
FIG. 3 is a generalized block diagram of a computer system having one or more Central Processing Modules connected to the system bus in addition to main memory and other system modules such as I/O modules.

Thus, there will be no inherent electrical delay in getting the processor addresses into the cache module 19 (FIG. 2) for an address scanning investigation operation. Further, due to the processor's high priority state, the cache data RAMs 19d will sit and be ready (when a hit occurs in Tag RAM 19t) in order to send the hit data immediately back to the processor 14.

Since the processor 14 has been given the top priority in accessing the cache bus 14c, the invalidation queue 20iq and its access path 29, must take a "lower" priority position. This functions such that, under normal conditions, the buffer 14bi between the invalidation queue 20iq and the cache bus 14c is normally "disabled" from driving into the cache bus 14c as controlled by Logic 20c. The effect of this lower priority state is that when the invalidation queue 20iq does access the cache module 19, the buffer 14bi is then "enabled" in order to drive the cache bus 14c and an extra delay clock time must be allowed for the bus directional operation to settle down. When the invalidation queue 20iq does actually access the bus 14c, the processor 14 must first be taken off the bus by disabling the buffer 14bc of FIG. 1. Then the queue path buffer 14bi can then be "enabled" to drive the invalidation addresses over to cache 19. Thus, the invalidation address from the invalidation queue 20iq to the cache module 19 is delayed by one clock time. Again, it may be seen that it is better to delay invalidation cycle operations than it is to slow down the processor 14. The invalidation cycles, when given access to the cache 19 will take two or three (if a hit occurs) clock times. Once the invalidation queue 20iq does have the cache module 19 for access and use, the processor 14 cannot get to the cache module 19 until the invalidation cycle is completed, which may involve two or three clock periods.

Figure 5A:
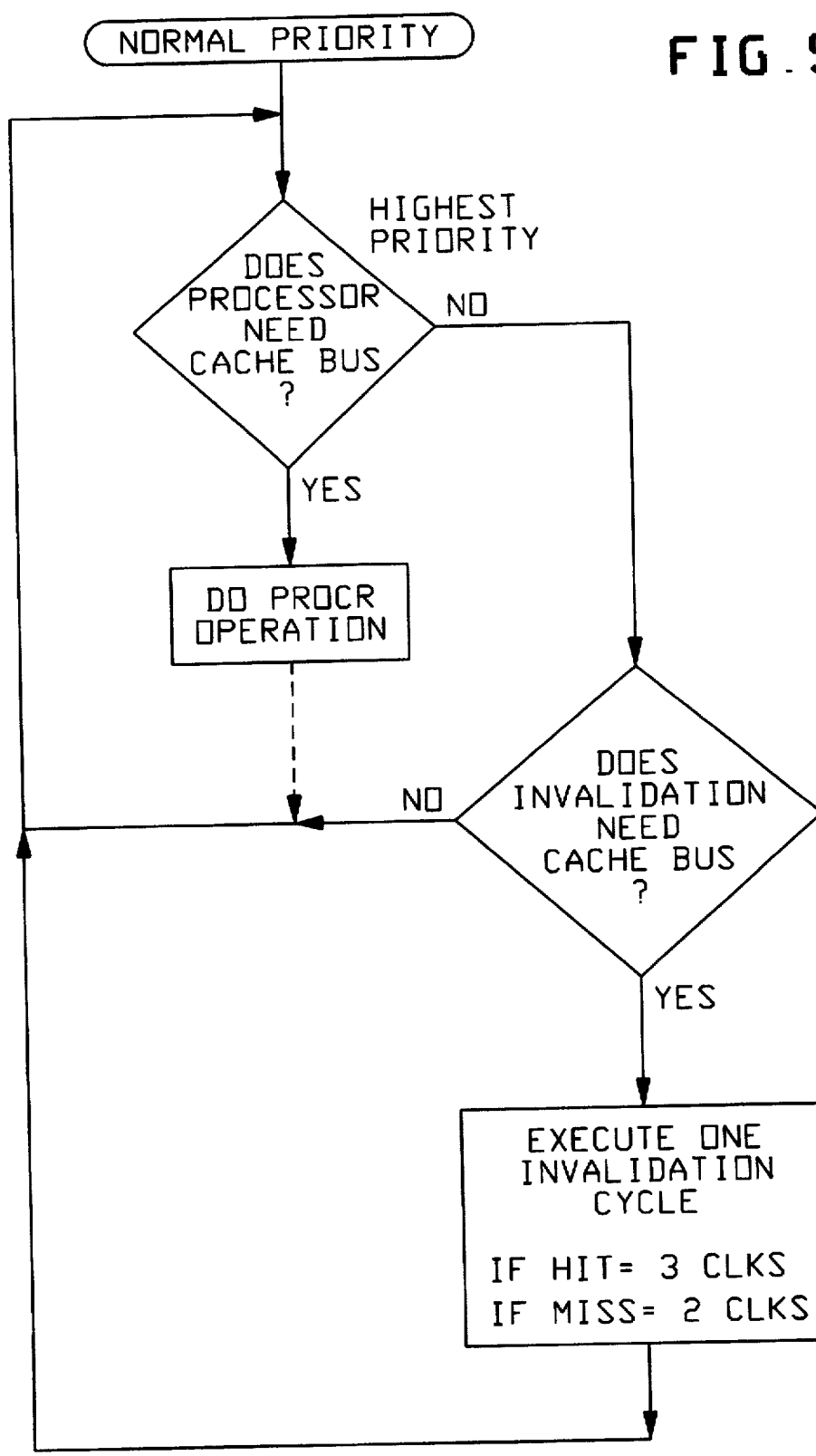
FIG. 5A is a flow chart indicating the "normal" priority condition.

FIG. 5A is a flow chart illustration of operations for the conditions of normal priority. Here, the highest priority goes to the processor 14, so that when the processor does need the cache bus (yes), the processor operation is enabled access to the cache bus 14c and the cache module 19. On the other hand, if the processor does not need access to the cache bus 14c (No), then the system operates to see if the invalidation queue 20iq needs the cache bus. If such is the case (Yes) then, access to the cache bus is given so that there can be an execution of one invalidation cycle. If the invalidation queue does not need the cache bus (No), then the system returns to its normal operation giving the processor access if and when it needs it.

Figure 5B:
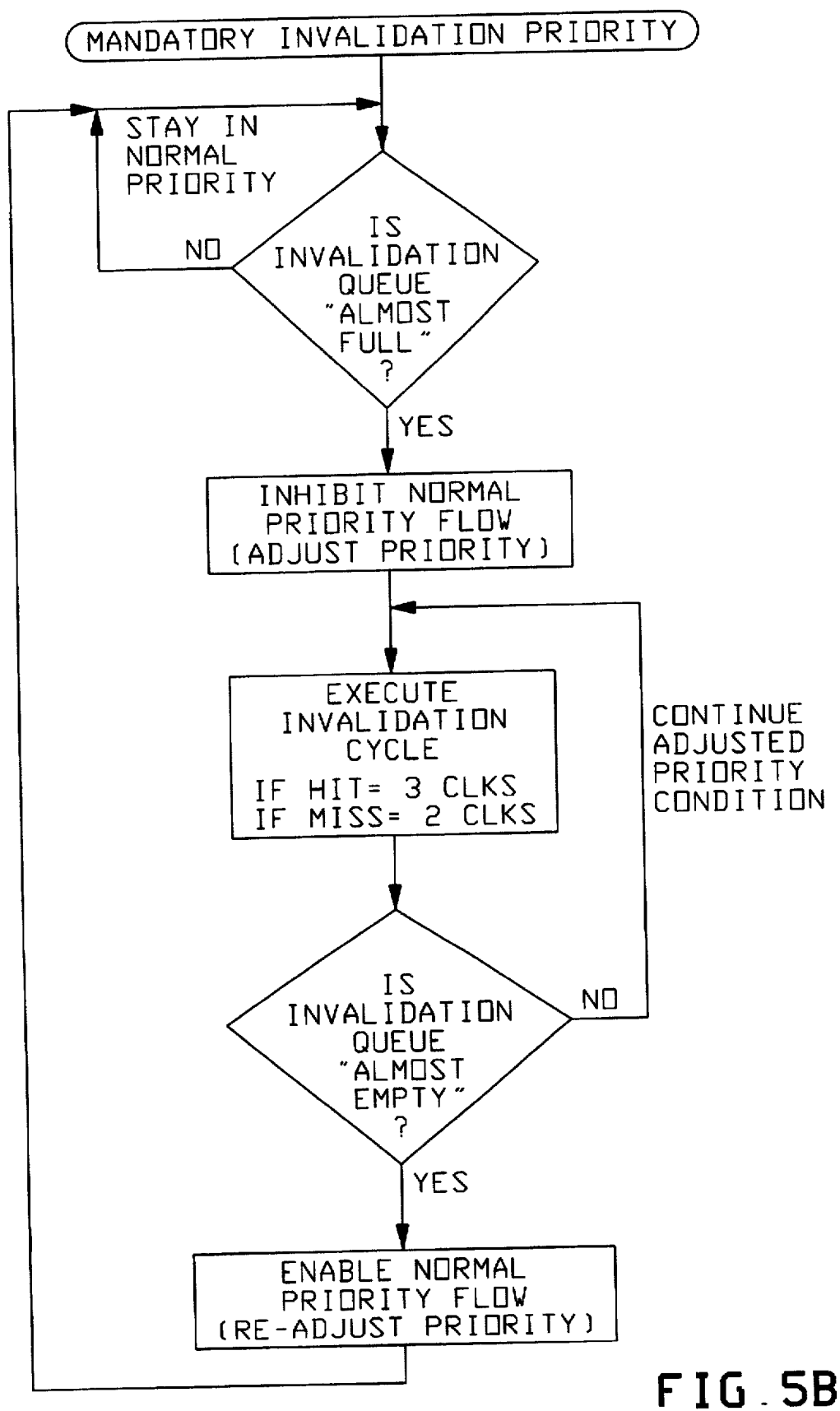
FIG. 5B is a flow chart showing the "Mandatory-Invalidate" priority condition.

FIG. 5B shows the "non-normal" Mandatory Invalidation priority. Here, when the in validation cache is "Almost-Full" (Yes), then the logic will inhibit the normal priority flow and adjust the priority to the mandatory invalidation priority. Here, the system will enable the execution of invalidation cycles which, as noted, take three clocks if there is a "hit" and only two clocks if there is a "miss". When the invalidation queue 20iq is "Almost-Empty", this is sensed by the priority control logic 20c (Yes) to enable normal priority flow, that is to say, to readjust the priority back to the normal situation where the processor gets top priority. If the invalidation queue is not "Almost-Empty" (No), then the system continues the Mandatory Invalidation priority condition.

Figure 5C:
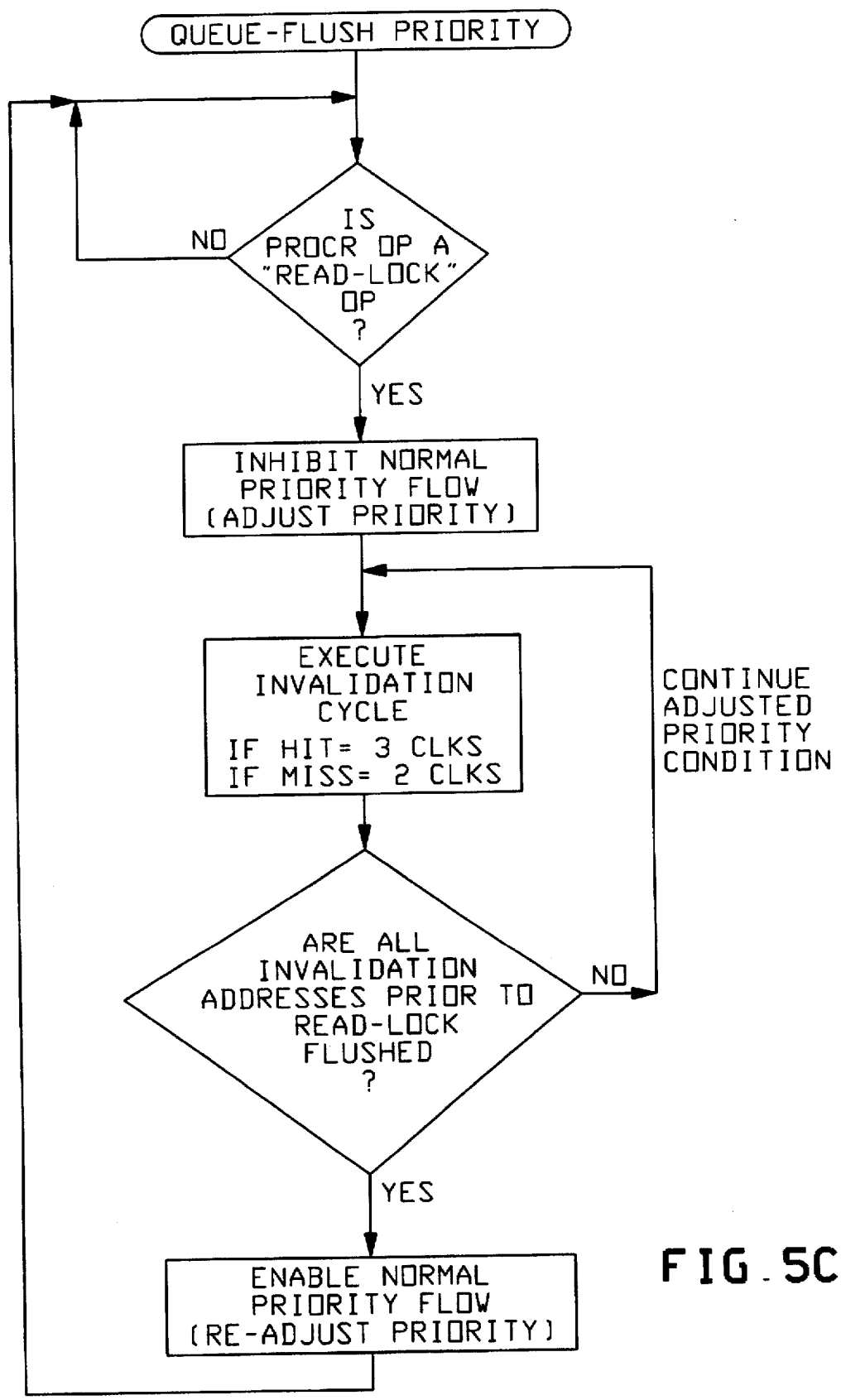
FIG. 5C is a flow chart illustrating operations for the "Queue-Flush" priority condition.

The next "non-normal" condition is the Queue-Flush" priority condition shown in FIG. 5C. Here, the priority control logic 20c will sense whether there is a "Read-Lock" operator (OP). If this is the case (Yes), then the normal priority flow is inhibited and the priority is adjusted to give priority to the invalidation queue 20iq. The invalidation queue will then function to execute the invalidation cycle until all addresses, prior to the "Read-Lock", are flushed out of the invalidation queue. Then the system will return to its normal priority flow with the highest priority of cache access to the processor 14.

It may noted that the invalidation queue 20iq may contain many address values. For example, in the presently described embodiment, the invalidation queue 20iq can hold up to 512 address values which can form a queue, but then only one address at a time is taken out of the invalidation queue for each individual invalidation cycle access to the cache module 19. This functions so as to "give back," to the processor 14, the cache resources of the cache module 19 as soon as possible. It may be noted that the single address access from the invalidation queue occurs when the system functions under "normal" circumstances.

However, sometimes the conditions change to require new operations. As indicated before, the number 1 priority position for access to cache for the processor 14 is given under "normal" circumstances. However, when conditions change, the circumstances may not be considered "normal". Thus, the present system has the feature of "adjusting" the priority levels when conditions change from normal as sensed by Priority Control Logic 20c, FIG. 1. There actually can be three different priority conditions which can be set up to occur which will cause the access priorities to the cache module to be changed. These priority conditions are indicated below as A, B, and C.

(A) Normal Conditions Priority

Under "normal" circumstances, the invalidation queue 20iq gets access to the cache module 19 only when the processor does not need to access the cache module 19. The invalidation cycles from the invalidation queue are placed or worked in-between the processor accesses to the cache module 19. This particular normal-type case occurs most of the time. However, it should be remembered that the processor 14 does access-type operations to the cache approximately only once every five clock periods on an average basis. Since, during said cache-type operations, the processor 14 only needs to use the tag RAM 19t for two clock times out of the five clock periods, this leaves three clock times, on the average, for the invalidation queue 20iq to make use of the cache module resources 19, without slowing or affecting the processor performance in getting access to the cache modules.

In the normal priority situation shown in FIG. 6, the average processor OP may take a period of, on the average, five clock cycles. The processor operation to the cache may be using the cache bus 14c for only the clock periods 1 and 2, leaving clock periods 3, 4 and 5 available for the invalidation queue, 20iq, for access to complete the invalidation cycles required. Here, the normal priority operation shows that there is a sharing of the cache bus 14c between the processor 14 and the invalidation queue 20iq.

(B) Mandatory-Invalidation Condition Priority

There are two other "non-normal" conditions where the present system will adjust the priority format in order to provide access to the cache module 20. The first (B) of these non-normal conditions is called "Mandatory-Invalidation". When this condition occurs as a result of a signal indicating that the invalidation queue 20iq is ⅞ full, the cache access priorities will be adjusted to give the invalidation queue the first right of access to the cache and the processor may possibly have to wait. Here, the bus buffers 14bc and 14bi are reversed in directional flow, that is to say, the invalidation queue is "enabled" to drive into the cache bus 14c and the processor 14 is "disabled" from the cache bus 14c. By reversing this drive situation, the extra bus delay clock for invalidation cycles is removed. Thus, addresses can be removed even more quickly from the invalidation queue in order to search for address hits in the cache module 19.

Referring to FIG. 7, there is seen the clock periods required for an invalidation cycle. Once the priority is adjusted, the invalidation cycle does not need the extra (third) clock time to turn around the buffers. Thus, in FIG. 7, under "normal" priority conditions, the first clock period is used to "turn around" the bus buffers, but in the "non-normal" priority condition, there is no need to turn around the bus buffers and the invalidation cycle can proceed during the first clock period. It may be noticed that if a "hit" occurs, indicating the address is located in the cache module 19, then an extra clock period is required as shown in FIG. 7. Thus, it may be noted that during the normal priority situation, where the processor and the invalidation queue will share the cache bus, there are three clock periods required if a "hit" occurs. On the other hand, in the non-normal situation, without the need for buffer turnaround time, the invalidation cycle takes only two clock periods if the hit occurs in the cache module 19.

The invalidation queue 20iq has a finite depth of storage capability, that is to say it may fill up if enough addresses of the "Write memory" type occur on the system busses $22_r$. In the present embodiment, the queue depth of the invalidation queue 20iq is a maximum of 512 address values. If the invalidation queue were to get full and if subsequently more addresses continued to come on the system busses $22_r$, this would involve no more available address space for storage. Thus a dangerous data incoherency condition could arise, since certain data in cache 19 could not be marked as "invalid."

The cache data and the addresses in the Tag-RAMs must be kept "coherent," that is to say, they must always hold only the most recent "valid" data values which match the valid data values presently existing in the main memory 40. Thus, all memory Write operations which are participated in, by the system modules, must be spied upon by the spy logic 20. However, if the invalidation queue 20iq is all "full", the problem arises as to where these new Write addresses should be held. In any case, they might be lost, that is to say, not be spied upon by the spy logic 20 which leads to an unacceptable situation in system operation.

If the invalidation queue 20iq were to become full up, the spy logic 20 would automatically force all subsequent memory Write operations, on the system busses $22_r$ to be aborted, that is to say, set aside and forced to be "retried" again at some later time. The spy logic 20 will continue to force aborts until such time it has some place to put the addresses attributable to the invalidation queue. Such "aborts" of the operations of the other system modules 50 and 70, protects the cache data validity but this is highly undesirable as far as the efficiency of system performance is concerned.

Each of the other system modules 50 and 70 have important work to do as well and must not be completely divorced from using the system. The other auxiliary system modules 50, 70 have to contend for system bus 22 access and once they start their memory operation, they will have to have the memory operation aborted, that is to say, the cache memory access operation aborted because the invalidation queue 20iq is full and the data in cache is now suspect.

Thus, to prevent or, to at least, greatly minimize this unfortunate possibility, of their being an invalidation queue in the "full-up" condition resulting in unwanted abort cycles, the features of adjusting the cache access priority to the "Mandatory-Invalidation" state is added to the system. This condition occurs when the invalidation queue 20iq reports to Priority Control Logic 20c that is "almost full." The "Almost Full" condition is indicated when the invalidation queue is ⅞ths full; that is to say, contains 448 address values of the total 512 address values.

Figure 8:
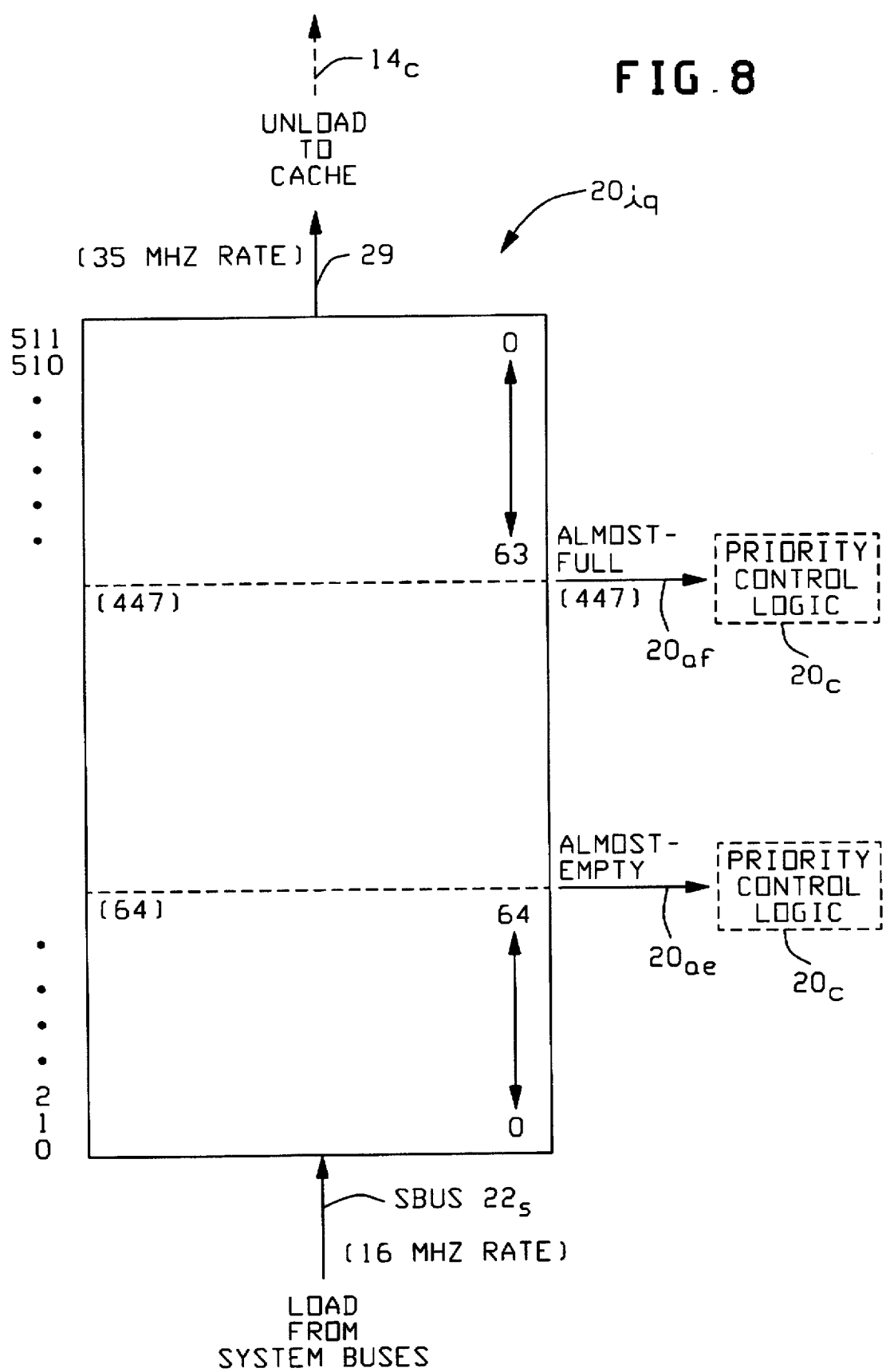
FIG. 8 is a drawing of the invalidation queue showing the sensing signals for "Almost Full" and "Almost Empty" levels.

As seen in FIG. 8, the invalidation queue 20iq is organized, in this implementation, to hold 512 addresses. At the address position 447 (448 addresses), the invalidation queue will sense that it is ⅞ full, "Almost-Full," and provide an output signal 20af to the Priority control Logic 20c. Likewise, when the invalidation queue only has 65 addresses (designated at 64), then a signal is generated on line 20ae as the "Almost-Empty" signal to the Priority Control Logic 20c. This situation gives some extra padding for unloading the invalidation queue 20iq onto the cache module 19 before the "queue-full" condition can occur. If the invalidation queue 20iq indicates that it is "almost full," then the cache access priority is adjusted to the "Mandatory-Invalidation" condition. Thus, here, the processor 14 is taken off the cache bus 14c and the invalidation queue 20iq is enabled on line 29 over to the cache bus 14c. Then the invalidation cycles from the invalidation queue to the cache module are initiated at their most rapid possible rate. Here the invalidation queue will hold on to the cache module 19 without letting go until the mandatory condition (almost empty) is satisfied, as per FIG. 5B.

The "Mandatory-Invalidation" condition is exited when the invalidation queue indicates to Control Logic 20c that it is "almost empty." This is set to occur when the invalidation queue is down to ⅛th full, that is to say, it only contains 64 addresses which constitute the remaining number of incomplete invalidation cycles. At this point, the cache priority will be adjusted automatically back to the "normal condition" where the processor 14 then has first call on access to the cache module 19.

(C) Queue-Flush Condition Priority

The second "nonnormal" condition is designated as the "Queue-Flush" condition. Again here, as with the prior Mandatory Invalidation case state, the access to cache is adjusted to take the processor 14 off of the cache bus 14c and to put the invalidation queue 20iq onto the cache bus 14c. This adjustment allows for faster invalidation cycles out of the invalidation queue as a result of saving the one clock delay period normally required for bus settling as was indicated in FIG. 7.

The "Queue-Flush" condition occurs not due to the queue getting "full", but rather is based upon a specific operation (OP) by the processor 14. This Queue-Flush condition occurs when the processor functions to do what is called a "Read-Lock" operator (OP) to the cache module 19 and main memory 40. This operator (OP) is similar to a normal memory Write-type operator. The Write-type operator "overwrites" the value currently stored at a specific address in the main memory 40. However, this "Read Lock" operator also returns to the processor 14, the value (data value) "previously stored" at that particular main memory address. Thus, what occurs is a sort of a "memory swap" type of action. The Read-Lock operator is used by the processor 14 when it is doing "lock" and "unlock" contention resolution on areas of memory that are shared by multiple processors. These involve contention algorithms which require that memory Reads, that immediately follow the Read-Lock operation, must always provide the absolutely most recent information. However, with the cache memory module such as 19, there is a possibility that the cache module may return a "hit" on data which is not quite the most recent data. This could occur because other system modules (especially another CPM in the system) may have Write addresses queued up in the spy invalidation queue 20.

A queued Write address (in the invalidation queue) for a location that the processor 14 may want to read immediately after the Read-Lock OP, may still be in the invalidation queue 20iq (but not yet invalidated) when the processor 14 does the Read-Lock operation. This "latency" time (for memory writes to be invalidated) in cache 19 does not normally cause any problem except in the situation where there is contention using the algorithm involved. If an earlier and older "Write" to the address to be "Read" following the Read-Lock OP, is still in the invalidation queue, then the cache module 19 may have "old" data at the Read location and will then give "old" (bad) information back to the processor 14. By "flushing" the invalidation queue, that is to say, completingdoing all the invalidation cycles occurred "prior" to the Read-Lock operation, the system can assure that there will not be the reading of any old data from the cache module 19.

Thus, whenever the processor 14 does a Read-Lock operation (OP), the spy queue 20iq must be "flushed" of all address values that "preceded" the Read-Lock OP to main memory. By "flush," it is not meant to dispose or throw away the addresses, but is meant that these addresses must immediately be executed from the invalidation queue 20iq to the cache 19 by the use of invalidation cycles. The Queue-Flush condition, like the Mandatory-Invalidation case (B), allows the invalidation queue 20iq to take the highest priority with regard to the use of cache resources. This invalidation cyclic action will continue using all addresses in the invalidation queue 20iq, (placed there prior to the Read-Lock operation) until these addresses have been invalidated in the cache memory 19. After this completion, the "priority" for cache access automatically returns to the processor 14, where it is given its normal "first" priority state.

Described herein has been a computer network providing a system using three levels of priority for access to the cache module. The first or normal priority arrangement is for the processor to get first access to the cache. The second or "non-normal" situation is called the mandatory-invalidation priority situation where the circuitry is rearranged to give higher cache access priority to the invalidation queue over that of the processor to access the cache. The third situation which is also a non-normal condition, is the "Queue-Flush" condition where the processor is taken off the cache bus and the invalidation queue is put onto the cache bus for top priority of access. The Queue-Flush condition occurs whereby the invalidation queue must be flushed-out of all those address values for (the completion of invalidation cycles) that "preceded" the Read-Lock OP to main memory.

This specialized multi-level access method will enable the system to provide normally the fastest possible access to cache by the most important element in the system which is the processor. However, the system also does provide for cases, where further system degradation may occur, if fast access is not provided when absolutely necessary to the invalidation queue for a temporary period. As a result of this, high performance is optimized while the data validity and integrity is protected. The system also provides a multiple processor system algorithm support that is necessary for task switching and message passing between processors. The multiple processor algorithms are generally found in the master control program software of the operating system. Thus, the present system has as its function, the assisting of the software in the master control program so that it will always read new data (not old data) immediately following a Read-Lock operation.

While one embodiment of the described system has been presented, other embodiments may encompass the invention as defined in the following claims.

What is claimed is:

1. In an enhanced throughput network for a central processor which adjusts priority in the contention for cache memory via a cache bus between the central processor and an invalidation queue, an on-the-fly priority adjusting system comprising:

(a) means for granting priority of cache memory access to said central processor during normal operating conditions while also sharing cache bus access to said invalidation queue during periods while said central processor is idle and waiting for data from said memory;

(b) means to sense special conditions in said network, said special conditions being signaled when said invalidation queue is "almost full", including:

(b1) means to immediately change priority of cache memory access via said cache bus to said invalidation queue during said special conditions.

2. the system of claim 1 wherein said means to sense includes:

(2a) priority control logic means for activation when said invalidation queue is filled to ⅞ capacity with addresses to be invalidated including:

(2a1) switching means for enabling cache memory access to said invalidation queue and disabling cache access by said central processor.

3. The system of claim 1 wherein said means to sense includes:

(3a) priority control logic means for activation, when said invalidation queue is only filled to ⅛ capacity with addresses to be invalidated, and including:

(3a1) means for enabling cache bus access for said central processor and also interleavingly enabling cache bus access by said invalidation queue during time periods when said central processor is idle.

4. The system of claim 1 wherein said means to sense includes:

(4a) priority control logic means for activation, when said central processor is initiating a Read-Lock operation (OP), and including:

(4a1) means to enable cache bus access for completion of invalidation cycles for all addresses which were residing in said invalidation queue before the occurrence of said Read-Lock OP.

5. In a network having a central processing unit connecting, via a cache bus, to a cache memory means which also connects to a system bus holding main memory and external resource modules, a system for enhanced throughput with on-the-fly priority adjustment for access to said cache bus comprising:

(a) a central processing unit having a processor bus connected to a first switchable isolation buffer means for connection to a cache memory means via a cache bus;

(b) said cache memory means connected to said cache bus and to a second switchable isolation buffer means connecting to a system bus;

(c) said system bus connected to main memory and other external resource modules and providing addresses of write OPs on said system bus to a spy logic module, and including connection to said second switchable buffer means;

(d) said spy logic means connected to transmit said write OPs from said system bus to an invalidation queue means;

(e) said invalidation queue means providing a large capacity internal storage for at least 512 addresses and including:
  (e1) means to unload addresses from said internal storage to mid cache memory means at twice the speed that addresses can be loaded into said internal storage from said spy logic module;
  (e2) means for indicating an upper limit of "almost full" load condition of said internal storage;
  (e3) means for indicating a lower limit of "almost empty" load condition of said internal storage;

(f) priority control logic means for immediate on-the-fly adjustment of priority of access to said cache memory means as between said central processing unit and said invalidation queue, said control logic means including:
  (f1) means for sensing when said invalidation queue is less than "almost full" of addresses in order to allow first priority of cache access to said central processing unit but also allowing execution of invalidation cycles during periods when said central processor is idle and waiting for data from said cache;
  (f2) means for sensing when said invalidation queue is "almost full" of addresses so as to re-adjust priority of cache, bus access first to said invalidation queue until the invalidation queue is "almost empty";
  (f3) means for switching said first and second switchable isolation buffer means.

6. The system of claim 5 wherein said upper limit of "almost full" constitutes a load condition of ⅞ occupancy of the internal storage availability of said invalidation queue.

7. The system of claim 5 wherein said lower limit of "almost empty" constitutes a load condition of ⅛ occupancy of the said internal storage availability of said invalidation queue.

8. In a system where a CPU contends with an invalidation queue for access to a cache via a cache bus and where a spy snoop logic unit takes Write OPs from a system bus to load said invalidation queue, a method for enhancing throughput and adjusting priority of cache bus access on-the-fly, comprising the steps of:

(a) sensing when said invalidation queue is NOT "almost full" to give normal priority to said CPU for access to said cache bus;

(b) concurrently sharing said cache bus between said CPU and said invalidation queue to execute invalidation cycles to cache while said CPU is idle and waiting for data;

(c) sensing when said invalidation queue is "almost full" to give mandatory priority to said invalidation queue for access to said cache bus;

(d) returning said priority to said normal priority as soon as said invalidation queue is sensed as "almost empty".

9. The method of claim 8 which further includes the steps of:

(e) sensing when the CPU has commanded a Read Lock OP;

(f) establishing priority for executing an invalidation cycle for all invalidation queue addresses which preceded in time, the said Read Lock OP.

10. In a network wherein a central processor is switchably connected to a large capacity cache memory via a cache bus which is also switchably connected to a large capacity invalidation queue fed by a snoop module connected to a system bus holding main memory and other resource modules, a system for on-the-fly priority adjustment for access to said cache bus for enhanced throughput, said system comprising:

(a) priority logic control means for on-the-fly immediate priority adjustment for cache bus access between said contending central processor and said invalidation queue including:
  (a1) means to set a normal priority of cache bus access for said central processor while also interleavingly enabling invalidation queue access to said cache bus during periods of inactivity of said central processor;
  (a2) means to set a mandatory priority of cache bus access for said invalidation queue when said queue is sensed as "almost full";
  (a3) means to discontinue said mandatory priority as soon as said invalidation queue is "almost empty";
  (a4) means to maintain said normal priority when said invalidation queue is loaded and operating in the range below "almost full";
  (a5) means for switching access to said cache bus according to the priority setting of said normal priority or said mandatory priority.

(b) means for unloading said invalidation queue addresses to said cache bus at a higher transfer rate than the unloading of addresses into said invalidation queue from said snoop module.

* * * * *